United States Patent [19]

Progneaux et al.

[11] Patent Number: 4,585,821
[45] Date of Patent: Apr. 29, 1986

[54] ELASTOMER FORMING COMPOSITIONS

[75] Inventors: Eric R. Progneaux, Brussels; Brian R. Trego, Vossem, both of Belgium

[73] Assignees: Dow Corning Ltd., Barry, Wales; Dow Corning S.A., Seneffe, Belgium

[21] Appl. No.: 736,193

[22] Filed: May 20, 1985

[30] Foreign Application Priority Data

May 30, 1984 [GB] United Kingdom ............... 8413777

[51] Int. Cl.$^4$ ............................................. C08K 3/26
[52] U.S. Cl. .................................... 524/425; 524/588; 524/863
[58] Field of Search .................... 524/588, 863, 425; 428/447; 525/475

[56] References Cited

U.S. PATENT DOCUMENTS 3,676,420 7/1972 Fulton et al. ..................... 524/863
4,143,088 3/1979 Favre et al. ...................... 525/475

FOREIGN PATENT DOCUMENTS 962061  6/1964 United Kingdom .
972900 10/1964 United Kingdom .
1284203 10/1972 United Kingdom .
1372141 10/1974 United Kingdom .
1374834 11/1974 United Kingdom .
1438519  6/1976 United Kingdom .

Primary Examiner—Lewis T. Jacobs
Attorney, Agent, or Firm—Edward C. Elliott

[57] ABSTRACT

A composition which is curable in the presence of moisture to an elastomer having improved adhesion to certain substrates, especially concrete. The composition comprises the product obtained by mixing together (A) a polydiorganosiloxane having terminal silanol groups, (B) an alkoxysilane $R_aSi(OR')_{4-a}$ wherein R represents a monovalent hydrocarbon or halogenated hydrocarbon group having 1-6 carbon atoms, R' is a $C_1$ to $C_4$ alkyl group and a is 0 or 1, (C) an organic titanium catalyst, (D) a reinforcing or semi-reinforcing filler and (E) a polydiorganosiloxane gum having a plasticity number (ASTM Test D-926) in the range from 100 to 200.

The compositions are particularly suitable for use as sealants for building structures.

7 Claims, No Drawings

ELASTOMER FORMING COMPOSITIONS

This invention relates to compositions which are stable in the absence of moisture and which cure to elastomers when exposed to atmospheric moisture. It is parttcularly concerned with means for improving the adhesion of the cured elastomer to certain substrates.

Compositions which are curable to silicone elastomers on exposure to atmospheric moisture are well known commercially available products. Compositions of this type are usually based on a polydiorganosiloxane having terminal silicon-bonded hydroxyl groups and a crosslinking agent therefor, for example an acetoxy silane, an oxime silane or an amino silane. Moisture-curable compositions which employ an alkoxy silane as a crosslinking agent for the hydroxyl-containing polydiorganosiloxane and which contain a titanium catalyst are also known. Such compositions are described in for example G.B. Pat. Nos. 962 061, 972 900 and 1 372 141 and are widely employed as caulking and sealant materials. Although the titanium-containing compositions are generally satisfactory their adhesion to certain unprimed surfaces is less than satisfactory. In G.B. Pat. No. 1 284 203 there are disclosed compositions having improved adhesion to metals and which comprise a polydiorganosiloxane, an alkoxysilane, a titanium catalyst and talc. With regard to their employment as sealants, however, it is desirable that the compositions have improved and more consistent adhesion to masonry, particularly concrete, under wet conditions. There has therefore existed a continuing need to provide curable compositions of this type which exhibit improved adhesion in the cured state to concrete and other substrates. We have now discovered that the adhesion of such compositions can be improved if there are incorporated therein, in addition to the conventional ingredients, both a silica filler and a silicone gum. It is known from G.B. Pat. Nos. 1 374 834 and 1 438 519 to modify titanium-containing, moisture-curable compositions by incorporating therein certain polydiorganosiloxanes. The said polydiorganosiloxanes are, however, of relatively low viscosity and are added as viscosity depressants.

According to the present invention there is provided a composition curable to an elastomer in the presence of moisture and comprising the product obtained by mixing (A) 100 parts by weight of a polydiorganosiloxane having terminal silanol groups, a viscosity in the range from $5 \times 10^{-4}$ to $10^{-1}$ m²/s and wherein at least 70 percent of the total organic substituents are methyl groups, any remaining organic substituents being selected from phenyl, vinyl and fluoroalkyl groups: (B) from 0.5 to 15 parts by weight of an alkoxysilane represented by the general formula $R_a Si(OR')_{4-a}$ wherein R represents a monovalent hydrocarbon or halogenated hydrocarbon group having from 1 to 6 inclusive carbon atoms, R' represents an alkyl group having from 1 to 4 inclusive carbon atoms and a is 0 or 1: (C) from 0.1 to 10 parts by weight of an organic titanium catalyst having organic groups attached to titanium through TiOC linkages: (D) from 3 to 20 parts by weight of a reinforcing or semi reinforcing filler and (E) from 5 to 30 parts by weight of a polydiorganosiloxane gum having a plasticity in the range from 100 to 200 mm/100 as measured according to ASTM Test No. D926-67, and wherein at least 80 percent of the organic substituents are methyl groups, any remaining substituents being selected from phenyl groups and vinyl groups.

In the polydiorganosiloxane (A) at least 70 percent of the total organic substituents are methyl groups any remaining substituents being the terminal silicon-bonded hydroxyl groups and organic groups selected from phenyl, vinyl and fluoroalkyl e.g. trifluoropropyl groups. The preferred polydiorganosiloxanes (A) are those wherein substantially all of the organic substituents are methyl groups. The viscosity of the polydiorganosiloxane should lie within the range from $5 \times 10^{-4}$ m²/s to $10^{-1}$ m²/s. Most preferred as component (A) are the silanol-terminated polydimethylsiloxanes having a viscosity within the range from $2 \times 10^{-3}$ m²/s to $75 \times 10^{-3}$ m²/s. Polydiorganosiloxanes (A) are well-known substances. They are widely employed in the manufacture of moisture-curable elastomer-forming compositions and can be represented by the general formula

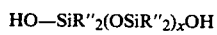

$$HO-SiR''_2(OSiR''_2)_x OH$$

wherein each R'' represents an organic substituent e.g. methyl, and x is an integer, preferably having a value in the range from about 500 to about 1350.

The alkoxysilane (B) may be any silane of the general formula $R_a Si(OR')_{4-a}$ where R, R' and a have any of the values hereinbefore ascribed. The group R may be for example methyl, ethyl, propyl, vinyl, phenyl, chloropropyl or trifluoropropyl. The alkoxy silanes and their use in moisture-curable compositions are well known in the art. Examples of the operative silanes are methyltriethoxysilane, phenyltrimethoxysilane, vinyltrimethoxysilane, methyltri(n-propoxy)silane, chloropropyltriethoxysilane and tetra(isopropoxy)silane: the preferred alkoxysilane being methyltrimethoxysilane. The proportion of alkoxysilane employed can vary from 0.5 to 15 parts by weight per 100 parts by weight of (A).

Preferably the alkoxysilane (B) is employed in an amount sufficient to provide in excess of 1 mol of alkoxysilane per mol of silicon-bonded hydroxyl in (A). In general the preferred proportion of alkoxysilane is from 4 to 10 parts by weight per 100 parts by weight of (A).

Component (C) of the compositions of this invention may be any organic titanium compound having organic groups attached to titanium through titanium-oxygen-carbon linkages. The two main types of organic titanium compounds falling within this definition are the orthoesters, that is the alcoholates, and the acylates in which the organic group is derived from a carboxylic acid. The titanium compound may also contain both types of groups attached to the same Ti atom and may also be partial condensates containing TiOTi linkages and having an average less than four organic groups per Ti atom. The operative titanium compounds thus include those of the formula $Ti(OZ)_4$ wherein Z is e.g. alkyl, alkoxyalkyl or acyl, for example tetra-isopropyl titanate, tetrabutyl titanate, tetra(methoxyethoxy) titanate and di-isopropyldiacetoxy titanate. The preferred titanium catalysts for use in the compositions of this invention are, however, the wholly or partially chelated titanium compounds. Such compounds can be obtained by reacting an alcoholate or phenolate of titanium, or a partial hydrolysate thereof with an α or β-diketone or a derivative of such a ketone. From about 1 to about 4 moles of the ketonic compound are employed per gram-atom of titanium. The alcoholate may be derived from an aliphatic or cycloaliphatic alcohol, or a phenol e.g. ethanol, isopropanol, n-butanol, cyclohexanol, and phenol. As the ketone reactant there may be employed a diketone, a ketonic acid, a keto-alcohol or an alkyl ester of a ketonic acid e.g. diacetyl, acetylacetone, acetoacetic acid and ethylacetoacetate. Most preferred are the titanium chelates derived from β-dicarbonyl compounds. Examples of such compounds are those represented by the general formula

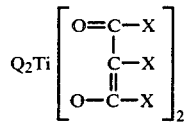

wherein the X groups may be the same or different and each X represents hydrogen or an aliphatic hydrocarbon group and Q is a group selected from monovalent aliphatic hydrocarbonoxy groups e.g. ethoxy, propoxy and butoxy, acyloxy groups e.g. acetoxy, a hydroxyl group or the two Q groups taken together represent an alkanedioxy group

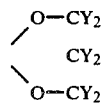

in which each Y represents hydrogen or a monovalent aliphatic hydrocarbon group. Specific examples of the preferred titanium catalysts are di-isopropoxytitanium bisacetylacetonate, di-isopropoxytitanium bisethylacetoacetate, ethoxy isopropoxytitanium bisacetylacetonate and di-n-butoxytitanium bisethylacetoacetate. Titanium catalysts which can be employed as catalysts in moisture curable compositions are well known and well documented in the art e.g. in G.B. Patent Nos. 962 061, 1 438 519 and 1 374 834.

The titanium catalyst may be employed in a proportion of from 0.1 to 10 parts by weight per 100 parts by weight of (A). For general application of the composition as a sealant the preferred proportion of catalyst (C) lies in the range from 1 to 4 parts by weight per 100 parts by weight of (A).

The compositions of this invention contain a reinforcing or semi-reinforcing silica filler (D) in a proportion of from 3 to 20 (preferably 7 to 15) parts by weight per 100 parts by weight of (A). Any finely-divided silica which has a reinforcing or semi-reinforcing action in a silicone rubber formulation may be employed. Such silicas generally have a surface area to weight ratio of at least 50 m$^2$/g and may be, for example, fume silicas, silica aerogels or precipitated silicas. Preferred as component (D) are fume silicas having a surface area to weight ratio in the range from 130 to 300 m$^2$/g. The filler (D) may be untreated or may be treated with organosilicon compounds e.g. silanes, siloxanes or silazanes, or with other substances.

Component (E) is a polydiorganosiloxane gum having a plasticity in the range from 100 mm/100 to 200 mm/100 when measured according to ASTM Test D 926-67 (at 23° C.). Gums with plasticities at the higher end of the range are highly viscous and are less readily incorporated into the composition than the less viscous gums. It is thus preferred to employ as component (E) gums which have a plasticity within the range from 125 to 175 mm/100. At least 80 percent of the total silicon-bonded organic substituents in (E) should be methyl groups any remaining substituents being selected from phenyl groups and vinyl groups. The polydiorganosiloxane (E) may therefore be for example a polydimethylsiloxane, a copolymer of dimethylsiloxane and methylphenylsiloxane units, a copolymer of methylvinylsiloxane and dimethylsiloxane units or a copolymer of dimethylsiloxane, methylvinylsiloxane and diphenylsiloxane units. If desired the polydiorganosiloxane may be end-stopped with triorganosiloxane units, e.g. trimethylsiloxane units. Component (E) may be incorporated into the compositions of this invention in proportions of from 5 to 30 parts by weight per 100 parts of (A). Less than 5 parts tends to result in inconsistent adhesion properties, especially with respect to concrete substrates. Greater than 30 parts of (E) can give rise to sealant compositions which are too viscous for satisfactory handling and application. It is generally preferred to employ (E) in proportions within the range from 5 to 20 parts by weight per 100 parts by weight of (A).

When preparing the compositions of this invention the order in which components (A) to (E) are mixed is not critical. Preferably the silane (B) is added to the polydiorganosiloxane (A) prior to the addition of the titanium catalyst (C) and the remaining components. However, any other appropriate sequence of addition may be used. For example, the filler (D) may be mixed into the polydiorganosiloxane (A) prior to the addition of (B) and (C) and the remaining components. Any suitable mixing equipment e.g. a two roll mill or a dough mixer, may be employed to prepare the compositions. Where continuous production is desired the components may be separately metered into a mixing chamber or some of the components may be premixed prior to combination with the remainder.

In view of the sensitivity of the compositions to moisture care should be taken to avoid the introduction of water during preparation and packaging if the optimum storage life is to be realised.

In addition to components (A) to (E) the compositions of this invention may contain other ingredients for modifying the physical or other properties of the curable compositions or of the cured elastomers. For example there may be added pigments, extending fillers, agents for modifying the flow properties of the curable composition and additional additives e.g. organofunctional silanes and siloxanes for further improving the adhesion of the elastomers to certain substrates. Any of the known extending fillers may be incorporated including diatomaceous earths, ground quartz, titanium dioxide and zinc oxide. A preferred extending filler is calcium carbonate which may advantageously be employed in amounts by weight ranging from about 50 to about 250 parts per 100 parts of (A). If desired the calcium carbonate may be treated to facilitate mixing with the other ingredients.

It is also preferred to incorporate into the compositions of this invention from about 1 to about 4 parts by weight per 100 parts by weight of (A) of one or more low molecular weight siloxane polymers for example those represented by the general formula HO(RMeSiO)$_n$H wherein R represents a methyl group or a phenyl group and n has a value of from about 4 to about 9.

Another optional ingredient which may advantageously be incorporated into the compositions is a liquid triorganosiloxy-terminated poldiorganosiloxane, for example a trimethylsiloxy-terminated polydimethylsiloxane. The viscosity of the liquid polydiorganosiloxane is not critical but typically falls within the range from $10^{-5}$ m$^2$/s to $20\times 10^{-3}$ m$^2$/s. The liquid polydiorganosiloxane is usefully employed in an amount of from 20 parts to 70 parts by weight per 100 parts by weight of (A). When present, the liquid polydiorganosiloxane acts as a plasticiser and increases the flowability of the curable product. It also reduces the modulus of the cured elastomer.

The compositions of this invention may be stored in the substantially anhydrous state and cure to elastomers on exposure to atmospheric moisture. They thus find use for example as sealing, caulking and coating compositions. The compositions exhibit improved adhesion to certain substrates particularly glass, aluminium and concrete and are therefore particularly adapted for use as building sealants.

The following examples, in which Me represents methyl, Ph represents phenyl, Vi represents vinyl and the parts are expressed by weight, illustrate the invention.

EXAMPLE 1

A curable composition was prepared as follows. Three parts of HO(PhMeSiO)$_n$H wherein n has an average value of about 6 was mixed into 100 parts of a silanol-terminated polydimethylsiloxane having a viscosity of about $5\times 10^{-2}$ m$^2$/s. To this mixture was then added with mixing 10 parts of a fume silica having a surface area of about 175 m$^2$/g, 15 parts of a siloxane gum having a plasticity of 150 mm/100 and comprising 98 mol % Me$_2$SiO units, 2 mol % MeViSiO units and terminal Me$_2$ViSiO units, 60 parts of a liquid polydimethylsiloxane having terminal trimethylsiloxy units (viscosity $10^{-3}$ m$^2$/s), 180 parts of fine particle size calcium carbonate, 7 parts of MeSi(OMe)$_3$ and 2 parts of diisopropoxytitanium bis(ethylacetoacetate).

In order to evaluate the adhesive properties of the composition when cured to an elastomer it was employed to make 'H-pieces'. A bead of the composition $12\times 12\times 50$ mm was formed between two parallel surfaces of respectively glass, concrete and aluminium to form sandwich-like test pieces having an 'H' cross-sectional profile. The test pieces were then exposed to normal laboratory atmospheric conditions (approximately 60% RH, 22° C.) for 4 weeks to effect cure of the bead to an elastomer.

The parallel substrates in the cured H-pieces were pulled apart at a rate of 6 mm per second until failure (complete separation of the substrates) occurred. In the case of each of the substrates failure occurred at 350–360% elongation and was cohesive, that is failure resulted from tearing of the elastomer and not separation of the elastomer from the substrate.

Similarly prepared H-pieces were immersed in water at 25° C. for 4 days and then stretched to 150% elongation for 24 hours. No failure of the test pieces occurred.

EXAMPLE 2

For comparison H-pieces were prepared according to the procedure described in Example 1 except that the siloxane gum was omitted from the composition.

In the case of the test pieces made from concrete substrates failure occurred at 200% elongation and resulted from a failure of the adhesive bond between the elastomer and the substrate. With respect to the glass and aluminium test pieces failure occurred at 250–300% elongation and resulted from tearing of the elastomer. In some cases this cohesive failure occurred at the interface of the elastomer and the substrate.

When the H-pieces were immersed in water at 25° C. for 4 days and then stretched to 150% for 24 hours adhesive failure occurred in more than 50% of the test pieces.

That which is claimed is:

1. A composition curable to an elastomer in the presence of moisture and comprising the product obtained by mixing (A) 100 parts by weight of a polydiorganosiloxane having terminal silanol groups, a viscosity in the range from $5\times 10^{-4}$ to $10^{-1}$ m$^2$/s and wherein at least 70 percent of the total organic substituents are methyl groups, any remaining organic substituents being selected from phenyl, vinyl and fluoroalkyl groups; (B) from 0.5 to 15 parts by weight of an alkoxysilane represented by the general formula R$_a$Si(OR')$_{4-a}$ wherein R represents a monovalent substituent selected from hydrocarbon groups and halogenated hydrocarbon groups each having from 1 to 6 inclusive carbon atoms, R' represents an alkyl group having from 1 to 4 inclusive carbon atoms and a is 0 or 1: (C) from 0.1 to 10 parts by weight of an organic titanium catalyst having organic groups attached to titanium through TiOC linkages; (D) from 3 to 20 parts by weight of a reinforcing or semi reinforcing filler and (E) from 5 to 30 parts by weight of a polydiorganosiloxane gum having a plasticity number in the range from 100 to 200 as measured according to ASTM Test No. D926-67, and wherein at least 80 percent of the organic substituents are methyl groups, any remaining substituents being selected from phenyl groups and vinyl groups.

2. A composition as claimed in claim 1 wherein the alkoxysilane is methyl trimethoxysilane.

3. A composition as claimed in claim 1 wherein the organic titanium compound (C) is a beta-dicarbonyl titanium chelate.

4. A composition as claimed in claim 3 which also contains finely-divided calcium carbonate.

5. A composition as claimed in claim 1 wherein the polydiorganosiloxane gum (E) has a plasticity within the range from 125 to 175 mm/100.

6. A composition as claimed in claim 1 which also comprises a triorganosiloxy-terminated polydimethylsiloxane having a viscosity within the range from $5\times 10^{-5}$ m$^2$/s to $20\times 10^{-3}$ m$^2$/s.

7. A process for sealing an article or structure which comprises applying to an article or structure a curable composition as claimed in claim 1 and thereafter allowing the composition to cure to an elastomer.

* * * * *